United States Patent
Talluri et al.

(10) Patent No.: US 7,748,009 B2
(45) Date of Patent: Jun. 29, 2010

(54) USE OF A PRECURSOR TO SELECT CACHED BUFFER

(75) Inventors: Madhusudhan Talluri, Bellevue, WA (US); Muthian Sivathanu, Madison, WI (US)

(73) Assignee: Microsoft Corporation, Redmond, WA (US)

( * ) Notice: Subject to any disclaimer, the term of this patent is extended or adjusted under 35 U.S.C. 154(b) by 1313 days.

(21) Appl. No.: 11/129,925

(22) Filed: May 16, 2005

(65) Prior Publication Data
US 2006/0271940 A1    Nov. 30, 2006

(51) Int. Cl.
*G06F 3/00*    (2006.01)
(52) U.S. Cl. ...................................... 719/313; 709/213
(58) Field of Classification Search ........................ None
See application file for complete search history.

(56) References Cited

U.S. PATENT DOCUMENTS

| 6,405,237 | B1 * | 6/2002 | Khalidi et al. ............... 709/203 |
| 6,601,112 | B1 * | 7/2003 | O'Rourke et al. ........... 719/312 |
| 7,454,477 | B2 * | 11/2008 | Talluri et al. ................. 709/213 |

OTHER PUBLICATIONS

Peter Druschel, Larry L. Peterson, Fbufs: A High-Bandwidth Cross-Domain Transfer Facility, Dec. 5-8, 1993, ACM Symposium on Operating Systems Principles: Proceedings of the fourteenth ACM symposium on Operating systems principles.*

Mitchell, J.G., et al., "An overview of the spring system," *IEEE Computer Society Press*, Spring COMPCON 94, Feb. 28-Mar. 4, 1994, 122-131.

Sivathanu, M., "Bulk data transfer: design specification," *NextGen*, date not available, 19 pages.

* cited by examiner

*Primary Examiner*—Hyung S Sough
*Assistant Examiner*—Kimberly Jordan
(74) *Attorney, Agent, or Firm*—Woodcock Washburn LLP

(57) ABSTRACT

Methods for increasing the efficiency of data transfers by passing a reference to the data rather than to transfer the data itself. When a new communication begins, a memory object, e.g. a buffer, is selected to receive the data. Information if provided that may be used to ascertain the communication path without actual knowledge of the path. If a communication pattern is likely to be repeated, a memory object created on the initial access is saved. The saved memory object ("precursor") is provided to the memory system on subsequent access as a hint about the process path to be used. The memory system can select a cached buffer that has a similar set of mappings to the precursor.

20 Claims, 3 Drawing Sheets

Prior Art

USE OF A PRECURSOR TO SELECT CACHED BUFFER

FIELD OF THE INVENTION

This invention relates in general to the field of computer software. More particularly, this invention relates to a system and method of providing for communication between processes.

BACKGROUND OF THE INVENTION

A standard way to communicate between two processes 1 and 2 (running on the same machine or running on different machines) is to send a message, via, e.g., an interprocess communication (IPC) mechanism. Often, for example, it is desirable to enable process 1 to send a message to process 2 asking process 2 to execute code on behalf of process 1. Typically, process 1 must have knowledge of a port or contact point for process 2 in order to do this.

The procedure of transforming the function call into a message is called marshalling. Marshalling converts what the code in process a sees as a function call into 1 message to be sent to process 2. The message must contain the name of the function and a set of parameters, coded in a way that process 2 understands. Process 2 receives the message and has to transform the message into a call to process 2's internal function. The process of converting a message into a function call is called unmarshalling. The piece of code that performs marshalling in process 1 is called a proxy and typically resides in the client process. The corresponding piece of code on the server side that performs unmarshalling is called a stub.

In the process of marshalling and unmarshalling, many copies of a message are made at various stages of the communication of the message. These copies, especially of large messages, consume large amounts of memory and require a significant amount of time to transmit. This adversely affects performance.

Referring to FIG. 1, in a conventional system, in order for process 1 to send a message to process 2, process 1 makes a first copy to a buffer 10. Thereafter, process 1 makes a system call to a kernel 14, which receives a second copy in a system buffer 12. The kernel 14 switches its context to process 2 and copies a third copy of the message into a buffer 20. Process 2 then copies a fourth copy the message into its memory space. Thus, for a message to be transmitted from process 1 to process 2 in a conventional system, at least four copies of a message are made. It would be advantageous to avoid making copies of messages and this process consumes CPU time and system memory.

A problem with conventional methods of communicating between two processes arises when the two processes do not trust each other. Typically a copy of the message is made by the receiving process to avoid problems that may occur if the send process should change the message, etc. This, disadvantageously, requires additional memory and overhead.

Thus, there is a need for system that overcomes the limitations of the prior art. The present invention provides such a solution.

SUMMARY OF THE INVENTION

The present invention is directed to systems and methods for increasing the efficiency of data transfers by passing a reference to the data rather than to transfer the data itself. When a new communication begins, a memory object, e.g. a buffer, is selected to receive the data. Information is provided that may be used to ascertain the communication path without actual knowledge of the path. If a communication pattern is likely to be repeated, a memory object created on the initial access is saved. The saved memory object ("precursor") is provided to the memory system on subsequent access as a hint about the process path to be used. The memory system can select a cached buffer that has a similar set of mappings to the precursor.

In accordance with the methods, the precursor allows the sending service to specify the communication without knowledge of the actual data communications path. In addition, a set of operations to be performed may be used to specify the communications path.

Additional features and advantages of the invention will be made apparent from the following detailed description of illustrative embodiments that proceeds with reference to the accompanying drawings.

BRIEF DESCRIPTION OF THE DRAWINGS

The foregoing summary, as well as the following detailed description of preferred embodiments, is better understood when read in conjunction with the appended drawings. For the purpose of illustrating the invention, there is shown in the drawings exemplary constructions of the invention; however, the invention is not limited to the specific methods and instrumentalities disclosed. In the drawings.

DETAILED DESCRIPTION OF PREFERRED EMBODIMENTS

Exemplary Computing Environment

Figure 1:
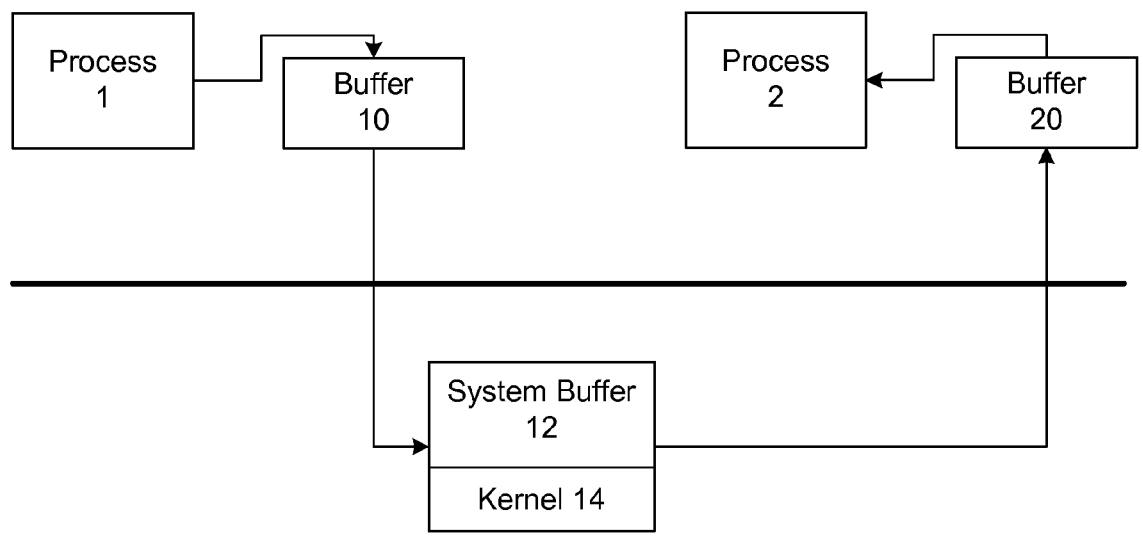
FIG. 1 illustrates communication of a message in a convention system.
Figure 2:
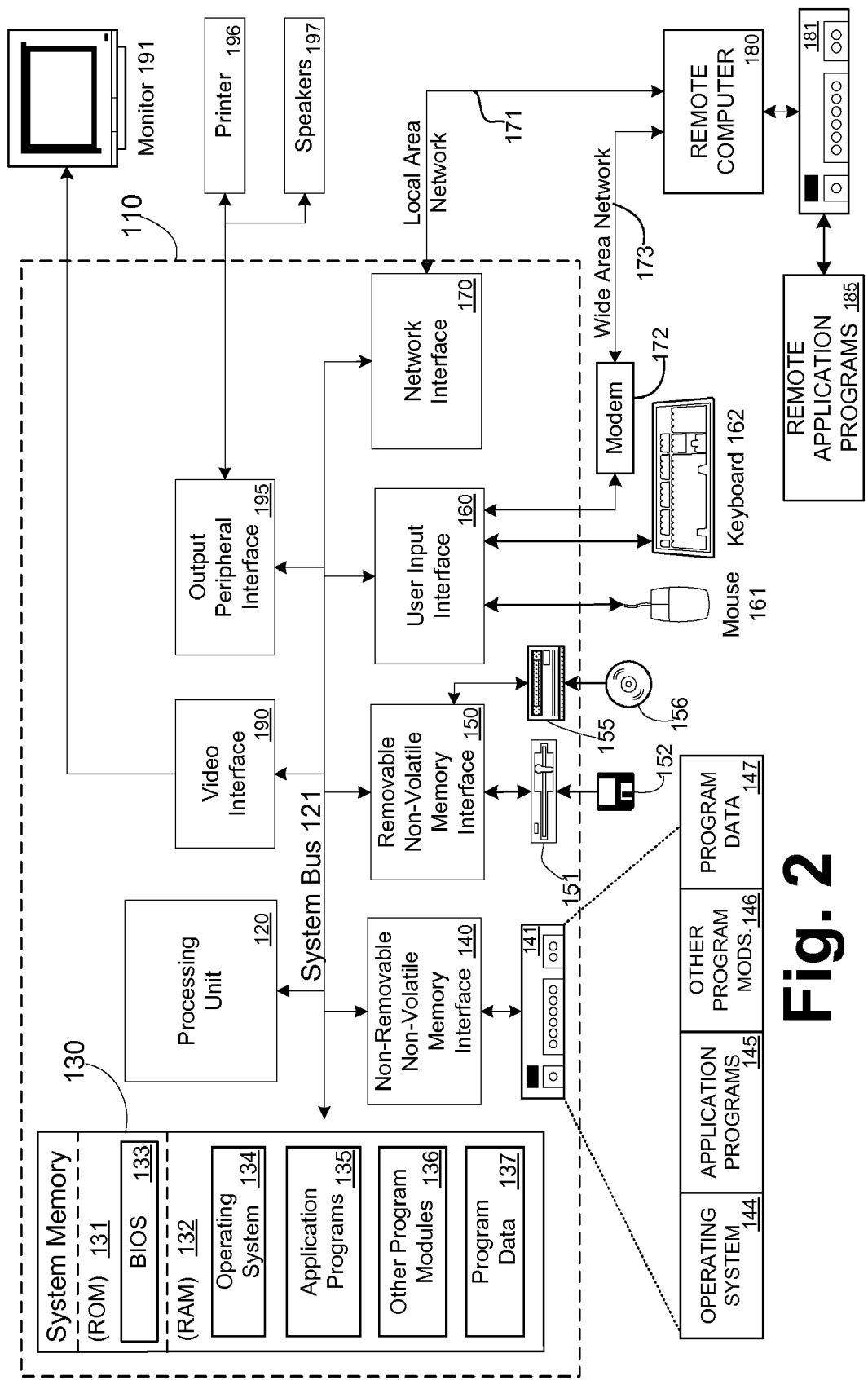
FIG. 2 is a block diagram showing an exemplary computing environment in which aspects of the invention may be implemented.

FIG. 2 illustrates an example of a suitable computing system environment 100 in which the invention may be implemented. The computing system environment 100 is only one example of a suitable computing environment and is not intended to suggest any limitation as to the scope of use or functionality of the invention. Neither should the computing environment 100 be interpreted as having any dependency or requirement relating to any one or combination of components illustrated in the exemplary operating environment 100.

The invention is operational with numerous other general purpose or special purpose computing system environments or configurations. Examples of well known computing systems, environments, and/or configurations that may be suitable for use with the invention include, but are not limited to, personal computers, server computers, hand-held or laptop devices, multiprocessor systems, microprocessor-based systems, set top boxes, programmable consumer electronics, network PCs, minicomputers, mainframe computers, distributed computing environments that include any of the above systems or devices, and the like.

The invention may be described in the general context of computer-executable instructions, such as program modules, being executed by a computer. Generally, program modules include routines, programs, objects, components, data structures, etc. that perform particular tasks or implement particular abstract data types. The invention may also be practiced in distributed computing environments where tasks are performed by remote processing devices that are linked through a communications network or other data transmission medium. In a distributed computing environment, program modules and other data may be located in both local and remote computer storage media including memory storage devices.

With reference to FIG. 2, an exemplary system for implementing the invention includes a general purpose computing device in the form of a computer 110. Components of computer 110 may include, but are not limited to, a processing unit 120, a system memory 130, and a system bus 121 that couples various system components including the system memory to the processing unit 120. The system bus 121 may be any of several types of bus structures including a memory bus or memory controller, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, Peripheral Component Interconnect (PCI) bus (also known as Mezzanine bus), Peripheral Component Interconnect Express (PCI-Express), and Systems Management Bus (SMBus).

Computer 110 typically includes a variety of computer readable media. Computer readable media can be any available media that can be accessed by computer 110 and includes both volatile and non-volatile media, removable and non-removable media. By way of example, and not limitation, computer readable media may comprise computer storage media and communication media. Computer storage media includes both volatile and non-volatile, removable and non-removable media implemented in any method or technology for storage of information such as computer readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can accessed by computer 110. Communication media typically embodies computer readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of any of the above should also be included within the scope of computer readable media.

The system memory 130 includes computer storage media in the form of volatile and/or non-volatile memory such as ROM 131 and RAM 132. A basic input/output system 133 (BIOS), containing the basic routines that help to transfer information between elements within computer 110, such as during start-up, is typically stored in ROM 131. RAM 132 typically contains data and/or program modules that are immediately accessible to and/or presently being operated on by processing unit 120. By way of example, and not limitation, FIG. 2 illustrates operating system 134, application programs 135, other program modules 136, and program data 137.

The computer 110 may also include other removable/non-removable, volatile/non-volatile computer storage media. By way of example only, FIG. 2 illustrates a hard disk drive 141 that reads from or writes to non-removable, non-volatile magnetic media, a magnetic disk drive 151 that reads from or writes to a removable, non-volatile magnetic disk 152, and an optical disk drive 155 that reads from or writes to a removable, non-volatile optical disk 156, such as a CD-ROM or other optical media. Other removable/non-removable, volatile/non-volatile computer storage media that can be used in the exemplary operating environment include, but are not limited to, magnetic tape cassettes, flash memory cards, digital versatile disks, digital video tape, solid state RAM, solid state ROM, and the like. The hard disk drive 141 is typically connected to the system bus 121 through a non-removable memory interface such as interface 140, and magnetic disk drive 151 and optical disk drive 155 are typically connected to the system bus 121 by a removable memory interface, such as interface 150.

The drives and their associated computer storage media, discussed above and illustrated in FIG. 2, provide storage of computer readable instructions, data structures, program modules and other data for the computer 110. In FIG. 2, for example, hard disk drive 141 is illustrated as storing operating system 144, application programs 145, other program modules 146, and program data 147. Note that these components can either be the same as or different from operating system 134, application programs 135, other program modules 136, and program data 137. Operating system 144, application programs 145, other program modules 146, and program data 147 are given different numbers here to illustrate that, at a minimum, they are different copies. A user may enter commands and information into the computer 110 through input devices such as a keyboard 162 and pointing device 161, commonly referred to as a mouse, trackball or touch pad. Other input devices (not shown) may include a microphone, joystick, game pad, satellite dish, scanner, or the like. These and other input devices are often connected to the processing unit 120 through a user input interface 160 that is coupled to the system bus, but may be connected by other interface and bus structures, such as a parallel port, game port or a universal serial bus (USB). A monitor 191 or other type of display device is also connected to the system bus 121 via an interface, such as a video interface 190. In addition to the monitor, computers may also include other peripheral output devices such as speakers 197 and printer 196, which may be connected through an output peripheral interface 195.

The computer 110 may operate in a networked environment using logical connections to one or more remote computers, such as a remote computer 180. The remote computer 180 may be a personal computer, a server, a router, a network PC, a peer device or other common network node, and typically includes many or all of the elements described above relative to the computer 110, although only a memory storage device 181 has been illustrated in FIG. 2. The logical connections depicted include a local area network (LAN) 171 and a wide area network (WAN) 173, but may also include other networks. Such networking environments are commonplace in offices, enterprise-wide computer networks, intranets and the Internet.

When used in a LAN networking environment, the computer 110 is connected to the LAN 171 through a network interface or adapter 170. When used in a WAN networking environment, the computer 110 typically includes a modem 172 or other means for establishing communications over the WAN 173, such as the Internet. The modem 172, which may be internal or external, may be connected to the system bus 121 via the user input interface 160, or other appropriate mechanism. In a networked environment, program modules depicted relative to the computer 110, or portions thereof, may be stored in the remote memory storage device. By way of example, and not limitation, FIG. 2 illustrates remote application programs 185 as residing on memory device 181. It will be appreciated that the network connections shown are exemplary and other means of establishing a communications link between the computers may be used.

Exemplary Embodiments of Using a Precursor to Select a Cached Buffer

Figure 3:
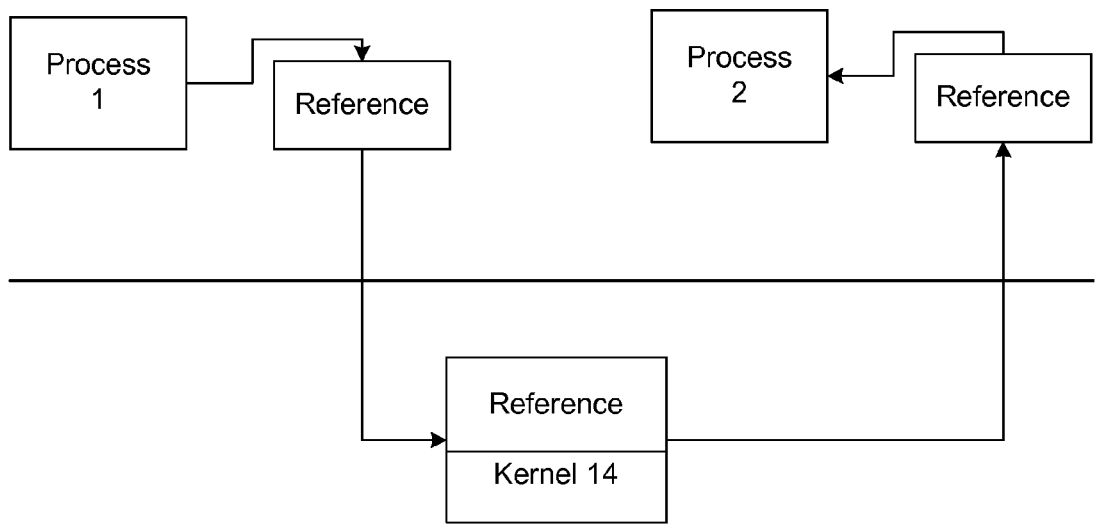
FIG. 3 illustrates communication of a message in accordance with the present invention.

For some types of data transfers, as shown in FIG. 3, it is more efficient to pass a reference to the data than to transfer the data itself as in conventional systems. There are two examples where this efficiency may be realized. One is where there are multiple processes in the communication chain and only some of them need to access the data, and the other is when the data is large (bulk data).

In conventional systems, the communication moves to a new process the buffer is mapped into that process and unmapped when done. Because services often communicate in bursts, they have good locality in their communication. For example, if a service sends data along a data path, it is likely that it will send more data along the same path in the near future. In accordance with the present invention, this data path locality is used within a memory object framework to cache mappings and memory allocation beyond the lifetime of a single memory object. By reusing such cached mappings, the cost of doing these operations can be amortized in situations where such data path locality exists.

In accordance with the above, the present invention provides a hint to the system by passing a "precursor" memory object. When the programmer expects to repeat a communication pattern many times, the memory object that was created on the first run is saved. In subsequent communications, this precursor acts as a hint to describe the process path without requiring the sending process/programmer to have knowledge of the details. The memory system may then pick a cached buffer that has a similar set of mappings to the precursor. In addition, the precursor may identify the subset of processes that will map the buffer.

In the present invention, the data path locality is used as follows. A separate type of memory object, e.g., a cached buffer memory object, is allocated. This type is a subclass of the basic memory object type, and exports the same interface otherwise. The behavior of a cached buffer memory object is the same as that of a normal memory object, except its behavior on an unmap and a dispose operation. When a mapped cached buffer memory object is unmapped via a call to the address space, an address space object does not actually perform the unmap, but instead records that this unmap is pending and simply returns. Also, when a cached buffer memory object is unreferenced, the actual memory allocated to it is not destroyed, but instead the memory object is added to a global free list of to-be-deleted memory objects. With this setup, when a service invokes a create method for creating a new cached buffer memory object, the present invention reuses one of the objects from the free list, without having to allocate new memory.

The benefit from this caching approach may be realized based on a selection of a suitable memory object to reuse on a new create request. It is preferable that the memory object that is reused from the free list has mappings in those address spaces on which the new memory object being created will have to be mapped. Thus, the create method needs to take a hint from the creating service to identify what the likely communication data path of the new memory object is going to be and which of those services in the path would actually map it. The present invention then reuses an appropriate memory object already mapped in those service address spaces. If no existing reusable memory object fits the hint specified by the service, a new memory object is allocated.

The process by which a service hints at the data path that will be followed by the memory object being created will now be described. The present invention utilizes implicit data path precursors. Even though a service may be ignorant of the exact data path a specific operation goes through, it will be aware of the fact that a set of operations are related and hence will likely go through the same data path. For example, if a service is reading data from a large file in the file system, it knows that all the read requests to the same file will most probably follow the same data path. This implicit information of data path locality is exploited in the precursor mechanism of the present invention.

On a create request, a service simply specifies a handle to a precursor memory object that it considers to be logically related to the new object being created. For example, in the file read case above, the service may create a new memory object to initiate a read of the first page of the file. To do this, the service indicates to the framework that the new memory object being created will be used "in a similar fashion" to the precursor, i.e., will likely follow the same data path and be mapped at the same address spaces. The memory object service then looks at the list of mappings the precursor has. From this, the system gains an understanding of the expected usage pattern of the new object being created. This notion of precursors, thus allows accurate hinting of the data path without burdening/constraining the service to know the actual data path the memory object would traverse.

This caching approach is preferably implemented where there is semi-trusted communication. If the recipient of the memory object does an insulate (i.e., an operation that logically creates a new copy of a memory object) because it does not trust the client, that would result in the forcible unmap of the memory object from the client, and thus such caching will be less effective. It is noted that the services invoke the same set of calls (i.e., map, unmap, release, etc.) as they would in conventional systems, and are unaware of the fact that such caching and reuse is occurring within the framework. Because of this decoupling between the actual optimizations and the service expectations, the present invention is completely free to reclaim resources as necessary, performing forcible unmaps or release of memory as it runs short of resources; service-level invariants would still hold.

The implementation details of the present invention will now be described. The bulk data transfer framework is preferably implemented in the form of in-kernel services: a memory object service and an address space service. These may be part of the same service or be two separate collocated services. This means that calls to the methods on the memory object or address space are normal IPCs into these services.

There is also a trust assumption between the memory object and address space services. Since the responsibility for map and unmap operations is split across the memory object and the address space, the address space object notifies the memory object in a timely fashion of a new map or unmap request. This is done because the memory object tracks a list of mappings for purposes of implementing insulate and revoke (i.e., an operation to revoke all outstanding handles to a memory object), and relies on the address space to be truthful about these events.

Building the memory object framework as a set of kernel services in the computing system of FIG. 2 includes implementing some basic infrastructure for performing IPC onto kernel services. Conventionally, an IPC infrastructure associates an object with a "supplying process," which is the service that handles method invocations on the object. On an IPC to an object, the infrastructure looks for the process owning the object and then queues the request in a thread associated with that process, and wakes up the thread, which then handles the actual request, and then makes a separate invocation to return to the caller.

Figure 4:
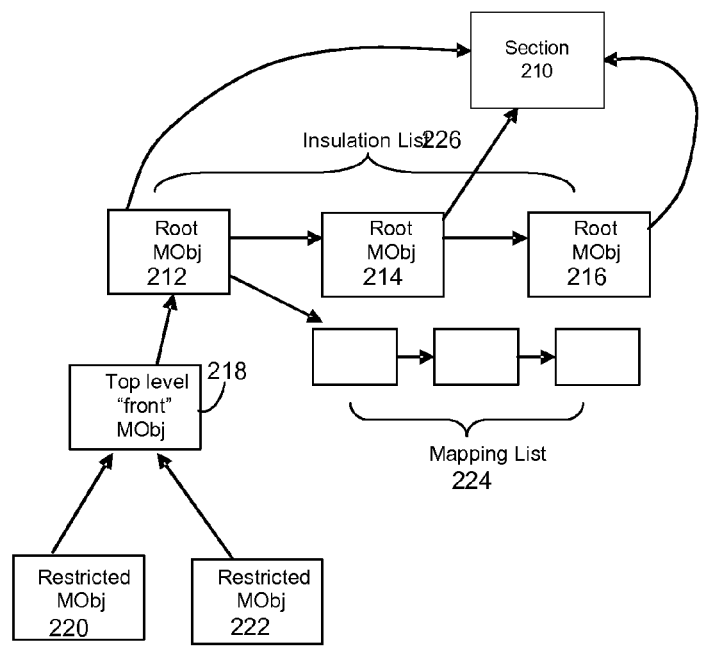
FIG. 4 illustrates exemplary data structures used by the present invention.

The basic data structures will now be described with reference to FIG. 4. The present invention utilizes two basic objects: the memory object and the address space object. There are cross-references between the memory object and the address space object because of the co-operation between them in maps and unmaps. The validity of these references is ensured by using the same unreferenced mechanism assuming that both these objects are serviced by different, collocated services. Each reference from the address space object to a memory object increments the reference count on the memory object, and would prevent the memory object from being unreferenced. Similarly, as long as a memory object maintains a reference to an address space, the address space object will not be unreferenced.

This inter-linkage has the following considerations with regard to cached buffer-style reuse of memory objects. For a memory object to be added to a free list (described below), it is unreferenced. However, a memory object will not be unreferenced as long as a mapping in the address space points to the memory object. Therefore, in order to allow memory object to be unreferenced with active mappings, a simple procedure is used: pass out only a "front" object to all services, where the real "root" object (Root Mobj 212-216) is visible only to the address space service. Since the mappings on the address space would only point to the root object, it would not prevent a top-level "front" object 218 from getting an unref. Also, when the top level front object receives an unref, no service other than the address space has an active reference to it. Thus, the real "root" object can be added to the free list. When the "root" object is reused, a new "front" object 218 is manufactured and is sent out.

There are two kinds of memory objects: the top level memory object 218 and restricted memory objects (e.g., objects 220, 222). Each restricted object has a top level memory object as its ancestor. The set of fields in the root object are different from the ones in the restricted object, though certain fields are common. Both objects share the same structure, with some fields being meaningful only in one of the types.

The top level memory object 218 will now be described. As described above, a memory object is the abstraction for a piece of memory. Internally, it uses WINDOWS memory sections 210 to create and manage the memory. Each top-level memory object 218 points to a section that represents that memory. To avoid opening the section object each time a mapping is required, the memory object 218 directly stores a handle to the section which can be directly specified in a map request. This handle is a kernel mode handle and hence cannot be directly accessed from the user level process.

The top level object 218 also contains the offset within the section that represents this memory object and the size of the object. The offset field for top level objects is currently zero for a newly created object, because each memory object is mapped to a unique section. Since the cost of creating new sections each time may be significant, a model may be used where one (or a few) large section(s) is used and then allocation work is performed within that section, to manage free space within the memory object framework. In that case, the offset could be non-zero even for newly created memory objects.

A structure that the top level memory object 218 maintains is a list of mappings 224 on the memory object. This list 224 may be a linear list since a single memory object will likely not have too many mappings. Each entry in the mapping list 224 may contain the following fields. First, it may contain a reference to the address space object that has the mapping and the virtual address within that address space where the mapping is made. Second, it may contain the access mode of the mapping and the offset and length within the memory object that is mapped. Finally, it may contain a reference to the actual memory object in whose context the mapping was done. This is used in the case of mappings of restricted objects, because the top level object alone maintains the mapping list. Other fields may be used as necessary.

The top level object 218 needs information on the context in which the mapping was done, so that in the case of a revoke of a restricted object, it may only unmap the mappings that were made in the context of that restricted object. The mapping entry may also contain a flag indicating whether the mapping is active or not. This flag is used for the cached buffer-style reuse implementation; an unmap of a memory object from an address space will just mark the mapping inactive in the memory object, but the mapping will still be physically present. Reusing the mapping thus simply involves flipping this flag.

The top level memory object 218 also points to an insulation list 226. This list 226 contains the list of logically different memory objects that share the same memory as a result of delayed copy insulation (i.e., none of the memory objects are currently write-mapped). A new memory object created will have a NULL insulation list, but as insulates occur on the same object, this list 226 can grow. This list 226 may be protected by a global set of locks, and the appropriate lock is chosen by hashing the address of the insulation list. All memory objects on the same insulation list share the same section. Only on a conflicting mapping, the conflicting mobj breaks away from the list and gets its new section.

The restricted memory object (220, 222) does not track a section handle or a mapping list 224, instead it just contains a reference to its parent object (e.g., top-level object 218). These parent pointers from restricted objects form a tree of restricted objects rooted at the top-level object 218. It may be preferable not track child pointers from the parent to simplify cleanup and synchronization. The semantics of the Offset and Size fields in a restricted object also is slightly different; the offset is relative to its immediate parent. Thus, if a restrict was made on a memory object specifying an offset of 4 k, the restricted object will have an offset value of 4 k. If the parent object's offset itself was, e.g., 8 k, the effective offset of the child from the viewpoint of the parent will be 12 k. Thus, to get the effective offset into the section, offsets need to be added up all the way to the root.

When the restricted object 220, 222 points to a parent object (e.g., top level object 218), the reference count is incremented on the parent object. This ensures that the parent object does not get an unref as long as there are restricted children which point to the object. It also simplifies the cleanup in that when a memory object gets unreferenced. It can directly free its data structures without worrying about other dependencies. Note, that the fact that a memory object is passed out only once (during the create) is another property that makes this possible.

Several fields are common across top level 218 and restricted objects 220, 222. The first field of the memory object is a Type field which helps the dispatcher find that a given reference is indeed a memory object; this is useful with the unref handler. This field is a substitute for type information tracked by the runtime. Each memory object is protected by a mutex which synchronizes changes to the memory object. A IsCached buffer field indicates whether the object is of type cached buffer. Restrictions of a cached buffer object are also cached buffer objects. A Freed flag is meaningful in the case of Cached buffer objects; it indicates whether the object is on the free list or is active. A Revoked flag indicates whether the object is revoked or not. Note, that in order to accommodate revoke semantics with the possibly collocated address space object that holds references to the memory object, an actual IPC revoke is not performed. Here, the object is marked revoked within the memory object, and then subsequent requests fail if the Revoked field indicates the object had already been revoked. A NumPendingMaps field contains the number of mappings currently in progress (being attempted) on the memory object. This field is required to avoid a race between a delayed copy insulate and a simultaneous map operation.

The address space object tracks the address space of a given process as it pertains to the memory objects that are mapped into it. The address space, thus tracks a hash table of the list of memory object mappings that have been made on the address space. An ActiveMappings hash table may contain this information. This table is hashed on the start virtual address of the mapping. Preferably, this is an AVL tree, which can be searched for the "closest matching address" as opposed to the "exact address" in order to facilitate partial unmaps.

Each entry in the mappings hash table contains the starting virtual address of the mapping and the length of the mapping. It also has a reference to the actual (possibly restricted) memory object that is mapped, and to the "root" memory object of the restricted tree to which the actual memory object belongs. While the actual memory object is tracked for purposes of notifying that object of a subsequent unmap of that mapping, the root object is tracked for purposes of cached buffer like delayed unmaps. Because a cached buffer memory object is added to the free list only after all its children are unreferenced, the address space cannot refer to the actual mobj in a "dying" mapping, i.e., a mapping which is freed, but has been delayed for possible reuse. Thus, such dying mappings point to the actual "root" object, which will remain valid as long as this pointer exists.

The address space object also holds a similar hash table of dying mappings. When an unmap is delayed, the mapping entry is moved from the active mappings to the delayed mappings list, after nullifying the actual memory object and making it point to the "root" memory object. An address space object also has a pointer to the IPC_PROCESS structure of the process corresponding to this address space. This is required for initialization and cleanup purposes as will be described later. Finally, each address space object has a Mutex to serialize concurrent map/unmap operations.

The address space object is pointed to by the IPC_PROCESS structure of each process, and gets allocated when the process tries to get a handle to its address space object (via, e.g., a special function). A process holding a reference to the address space increases the ref count of the address space object; thus the address space object for a process, once created, is not unreferenced until the process dies.

The free list, mentioned above, is used for the purpose of providing cached buffer-style reuse. When a top level cached buffer memory object is unreferenced, its "root" is added to this free list. The indexing strategies of maintaining the free list are as follows. Each memory object could be mapped in multiple address spaces. The lookup operation looks-up a memory object "mapped in nearly the same set of services as the precursor." A simple indexing strategy may be used where a hash key is constructed by composing the first and last address spaces in the memory object's mapping list (this would pertain to the last and first service that mapped the object respectively), and then adding the memory object to the free list hash table hashed on this composite key. On a lookup based on a precursor, the composite handle is constructed from the first and last address spaces of the precursor and look for a match. This strategy is fast and would cost only about 10000-15000 cycles. Moreover, in most common scenarios of data path locality, the first and last mappings accurately reflect the usage of the memory object.

While the present invention has been described in connection with the preferred embodiments of the various FIGS., it is to be understood that other similar embodiments may be used or modifications and additions may be made to the described embodiment for performing the same function of the present invention without deviating therefrom. For example, one skilled in the art will recognize that the present invention as described in the present application may apply to any computing device or environment, whether wired or wireless, and may be applied to any number of such computing devices connected via a communications network, and interacting across the network. Furthermore, it should be emphasized that a variety of computer platforms, including handheld device operating systems and other application specific operating systems are contemplated, especially as the number of wireless networked devices continues to proliferate. Still further, the present invention may be implemented in or across a plurality of processing chips or devices, and storage may similarly be effected across a plurality of devices. Therefore, the present invention should not be limited to any single embodiment, but rather should be construed in breadth and scope in accordance with the appended claims.

What is claimed is:

1. A method of communicating a message between a first process and a second process, comprising:
   receiving a precursor that provides a hint to a communication path from said first process;
   creating a precursor hash key based on a first and last address space associated with said precursor;
   selecting a root memory object having mappings similar to said precursor from a free list of memory objects by determining that said precursor hash key is a closest match to a first root memory object hash key, said root memory object being cached in a buffer and accessible only by an address space object;
   creating a front memory object mapped to said root memory object that is accessible by a plurality of objects;
   communicating said message using said front memory object;
   receiving a request to unreference said front memory object;
   unreferencing said front memory object;
   constructing a second root memory object hash key based on a first and last address space associated with said root memory object; and
   adding said root memory object to said free list of memory objects hashed on said second root memory object hash key.

2. The method of claim 1, said root memory object having properties such that when said root memory object is unmapped via a call to said address space object, and said address space object records that an unmap is pending and returns.

3. The method of claim 1, said method further comprising selecting said root memory object from said free list and reusing said root memory object by creating a second front memory object.

4. The method of claim 1, said selecting said root memory object comprising:
   upon a create request, reusing said root memory object from said free list of memory objects wherein said root memory object has mappings to address spaces to which a new root memory object being created by said create request will be mapped;
   creating a second front memory object mapped to said root memory object; and
   when said second front memory object becomes unreferenced, said root memory object is automatically added to said free list.

5. The method of claim 4, further comprising allocating said new root memory object in an address space if no said memory object has mappings to address spaces to which said new memory object being created by said create request will be mapped.

6. The method of claim 1, said selecting said root memory object further comprising:
   reusing said root memory object in accordance with a set of operations to be performed by said first process.

7. The method of claim 1, wherein said first process generates said hint to said communication path without knowledge of an actual data path to be used.

8. The method of claim 1, further comprising communicating said front memory object via said communication path that includes intermediary processes between said first process and said second process.

9. A computer readable storage medium having stored thereon computer executable instructions for communicating a message between a first process and a second process, said instructions for performing the method comprising:
   receiving a precursor that provides a hint to a communication path from said first process;
   creating a precursor hash key based on a first and last address space associated with said precursor;
   selecting a root memory object having mappings similar to said precursor from a free list of memory objects by determining that said precursor hash key is a closest match to a first root memory object hash key, said root memory object being cached in a buffer and accessible only by an address space object; creating a front memory object mapped to said root memory object that is accessible by a plurality of objects;
   communicating said message using said front memory object;
   receiving a request to unreference said front memory object;
   unreferencing said front memory object;
   constructing a second root memory object hash key based on a first and last address space associated with said root memory object; and
   adding said root memory object to said free list of memory objects hashed on said second root memory object hash key.

10. The computer readable storage medium of claim 9, said root memory object having properties such that when said root memory object is unmapped via a call to said address space object, and said address space object records that an unmap is pending and returns.

11. The computer readable storage medium of claim 9, further comprising instructions for selecting said root memory object from said free list and reusing said root memory object by creating a second front memory object.

12. The computer readable storage medium of claim 9, said selecting said memory object comprising:
   upon a create request, reusing said root memory object from said free list of memory objects wherein said root memory object has mappings to address spaces to which a new root memory object being created by said create request will be mapped;
   creating a second front memory object mapped to said root memory object; and
   when said second front memory object becomes unreferenced, said root memory object is automatically added to said free list.

13. The computer readable storage medium of claim 12, further comprising instructions for allocating said new memory object in an address space if no said memory object has mappings to address spaces to which said new root memory object being created by said create request will be mapped.

14. The computer readable storage medium of claim 9, said selecting said root memory object further comprising:
   reusing said root memory object in accordance with a set of operations to be performed by said first process.

15. The computer readable storage medium of claim 9, wherein said first process generates said hint to said communication path without knowledge of an actual data path to be used.

16. The computer readable storage medium of claim 9, further comprising instructions for communicating said front memory object via said communication path that includes intermediary processes between said first process and said second process.

17. A method for communicating data between two services, comprising:
   receiving a create request from a sending service;
   receiving a precursor memory object from said sending service;
   creating a precursor hash key based on a first and last address space associated with said precursor;
   reusing a root memory object from a free list of memory objects wherein said root memory object has a first root memory object hash key that is a closest match to the precursor hash key, and wherein said root memory object is accessible only by an address space service;
   creating a front memory object mapped to said root memory object that is accessible by a said sending service and a requesting service;
   communicating said data to said receiving service via said front memory object;
   receiving a request to unreference said front memory object;
   unreferencing said front memory object;
   constructing a second root memory object hash key based on a first and last address space associated with said root memory object; and adding said root memory object to said free list of memory objects hashed on said second root memory object hash key.

18. The method of claim 17, said reusing said root memory object being performed in accordance with a set of operations to be performed by said sending service.

19. The method of claim 17, wherein said sending service generates said precursor memory object without knowledge of an actual data path to be used.

20. The method of claim 17, wherein said sending process is unaware that said root memory object is cached in a buffer.

* * * * *